US006922321B2

(12) United States Patent
Katoh et al.

(10) Patent No.: US 6,922,321 B2

(45) Date of Patent: Jul. 26, 2005

(54) OVERCURRENT LIMITATION CIRCUIT

(75) Inventors: Tomonari Katoh, Osaka-Fu (JP); Kohichi Hagino, Hyogo-ken (JP)

(73) Assignee: Ricoh Company, Ltd. (JP)

( * ) Notice: Subject to any disclaimer, the term of this patent is extended or adjusted under 35 U.S.C. 154(b) by 161 days.

(21) Appl. No.: 10/314,229

(22) Filed: Dec. 9, 2002

(65) Prior Publication Data

US 2003/0128489 A1 Jul. 10, 2003

(30) Foreign Application Priority Data

Dec. 13, 2001 (JP) ....................................... 2001-380088

(51) Int. Cl.[7] ................................................. H02H 9/08

(52) U.S. Cl. ...................................................... 361/93.9

(58) Field of Search ............................... 361/93.9, 93.1, 361/88, 87

(56) References Cited

U.S. PATENT DOCUMENTS 5,642,252 A * 6/1997 Sakamoto et al. ......... 361/93.9
6,373,671 B1 * 4/2002 Watanabe et al. .......... 361/93.8
6,630,748 B2 * 10/2003 Sato et al. ................. 307/10.1

FOREIGN PATENT DOCUMENTS

CN 90221065 3/1992
JP 10-111722 4/1998

* cited by examiner

*Primary Examiner*—Brian Sircus
*Assistant Examiner*—James A Demakis
(74) *Attorney, Agent, or Firm*—Dickstein Shapiro Morin & Oshinsky LLP

(57) ABSTRACT

An overcurrent limitation circuit for use in a direct current stabilization electric power supply circuit controls and drives an output transistor to output a constant voltage in accordance with a difference between a reference voltage and a voltage proportional to the output voltage. The overcurrent limitation circuit includes a proportional output current generating device for generating a current proportional to a current flowing through the output transistor, a current/voltage-converting device for converting an output current flowing from the proportional output current generating device into a voltage, and a switching device configured to supply the current/voltage converting device with the output current from the proportional output current generating device when the output voltage is higher than a prescribed level, and interrupts the supplying when the output voltage is lower than the prescribed level. A control device is provided so as to control the output transistor to output a current in accordance with an output voltage at a current supplying point of the proportional output current generating device.

8 Claims, 4 Drawing Sheets

PRIOR ART

PRIOR ART

OVERCURRENT LIMITATION CIRCUIT

CROSS REFERENCE TO RELATED APPLICATIONS

This application claims priority under 35 U.S.C. § 119 to Japanese Patent Application No. 2001-380088 filed on Dec. 13, 2001, the entire contents of which are herein incorporated by reference.

BACKGROUND OF THE INVENTION

1. Field of the Invention

The present invention relates to an overcurrent limitation circuit employed in a direct current stabilization electric power supply circuit.

2. Discussion of the Background

FIG. 1 illustrates a conventional overcurrent limitation circuit as a first example. Such a circuit includes; a stabilization electric power supply that controls an output transistor M1 to output a constant amount of Vout in accordance with a signal obtained by amplifying a difference between a voltage, obtained by dividing the output voltage Vout with resistors R1, R2, and R3, and a reference voltage Vref using a differential amplifier (AMP); a differential amplifier block, wherein an input to a transistor M6 is a voltage obtained by dividing the output voltage Vout, and an input to the other transistor M5 is a voltage obtained by converting a current, which flows through a monitor transistor M2 in proportion to that carried in an output transistor M1, into a voltage with a resistor R4, and a transistor M7 is included so as to form a source follower circuit and give an offset to the voltage; and a control transistor M8 whose operation is controlled by an output from a differential amplifier block and controls a control line of an output transistor M1 between an output of an operational amplifier and an electric power supply voltage Vdd.

An operation of the circuit of FIG. 1 is described with reference to an output characteristics illustrated in FIG. 2. A current flowing through the transistor M2 is small when no load in connected to a current output terminal to relative to when a prescribed load is connected thereto during a normal operation. An input voltage to the transistor M5 is sufficiently smaller than that to the transistor M6. An input to the control transistor M8 is a high voltage, and an output Vout is constant due to turning OFF of the control transistor M8.

As an output current Iout increases and the input voltage to the transistor M5 rises, the input voltage to the transistor M8 declines. When the transistor M8 turns ON, since the input voltage of the transistor M1 is withdrawn to the electric power supply (i.e., VDD) side, an output current (Iout) is limited and the output voltage Vout starts descending.

Since the input voltage to the transistor M6 also descends as the output voltage Vout descends, an output of a differential block turns ON the transistor M8, when a current giving an input voltage of the transistor M5 and flowing through the transistor M2 decreases up to a prescribed level. In addition, the output current having a proportional amount thereto also decreases.

When the output voltage Vout is a ground level, the input of the transistor M6 is also the ground level. Due to a threshold voltage Vetch of the offset transistor M7, the input to the transistor M5 does not become zero, and is a stable point while a current (i.e., short current) flows through the output transistor M1. Both the resistors R1 and R2 can be neglected if current limitation is set in appropriate.

In a case of the exemplary circuit of FIG. 1, a value of a limit current is necessarily determined not to excessively flow through a load when a value of a short current is determined. Further, as understood from FIG. 2, in a case of a regulator capable of varying an output voltage, the lower the output voltage Vout, the smaller the value of the limit current is. As a result, current supplying capability sometimes is not maintained as a problem.

FIG. 3 illustrates a second example of an overcurrent limitation circuit 2. The overcurrent limitation circuit 2 includes a pair of circuits including a limit circuit and short limitation circuit. Since the short limitation circuit in the right side is substantially the same to the circuit 1 of FIG. 1, its description is omitted.

The exemplary circuit 2 additionally includes a limit circuit, and obtains output characteristics as shown in FIG. 4 by alternating the above-described two circuits at a prescribed point in the drawing.

When the output voltage Vout remains high, the output from the differential amplifier block of the short limitation circuit is high as described earlier, and the transistor M8 is turned OFF. Similar to the transistor M2, a current flowing through the transistor M9 in proportion to that carried in the transistor M1 is flowed to a resistor R5 by current mirror circuit formed from transistors M10 and M11. When a flowing current is large, a gate voltage for the transistor M12 becomes low, and a gate voltage for the output transistor M1 rises. As a result, a current flowing through the output transistor M1 is limited.

When the output voltage Vout becomes low, a gain of the right side short limitation circuit becomes higher, and the current (Iout) is further limited, thereby a curvature approaching the short current value Is and having an offset (i.e., a current value is not zero) is drawn.

This exemplary circuit 2 of FIG. 3 can separately set either a limit current value or short current value. However, a circuit configuration becomes complex due to two circuits and a necessary area becomes large in this circuit. Further, since a current limitation value (i.e., the minimum voltage causing the limit current) determined by the two circuits is fixed, optimal protection characteristics are hardly obtained.

SUMMARY

Accordingly, an object of the present invention is to address and resolve the above-noted and other problems and provide a new overcurrent limitation circuit. The above and other object are achieved according to the present invention by providing a novel overcurrent limitation circuit for use in a direct current stabilization electric power supply circuit for controlling and driving an output transistor (M16) to output a constant voltage in accordance with an output from a differential amplifier (M12) for amplifying a difference between a reference voltage and a voltage proportional to the output voltage. The overcurrent limitation circuit includes:

a proportional output current generating device (M11) configured to generate a current proportional to a current flowing through the output transistor (M16);

a current/voltage converting device (R11) configured to convert an output current flowing from the proportional output current generating device (M11) into a voltage;

a switching device (M12) configured to supply the current/voltage converting device (R11) with the output current from the proportional output current generating device when the output voltage is higher than a prescribed level, and interrupt the supplying when the output voltage is lower than the prescribed level; and a control device (M13) configured to control the output transistor (M16) to output a current in accordance with an output voltage of a current supplying point of the proportional output current generating device (M11).

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENT OF THE PRESENT INVENTION

Figure 1:
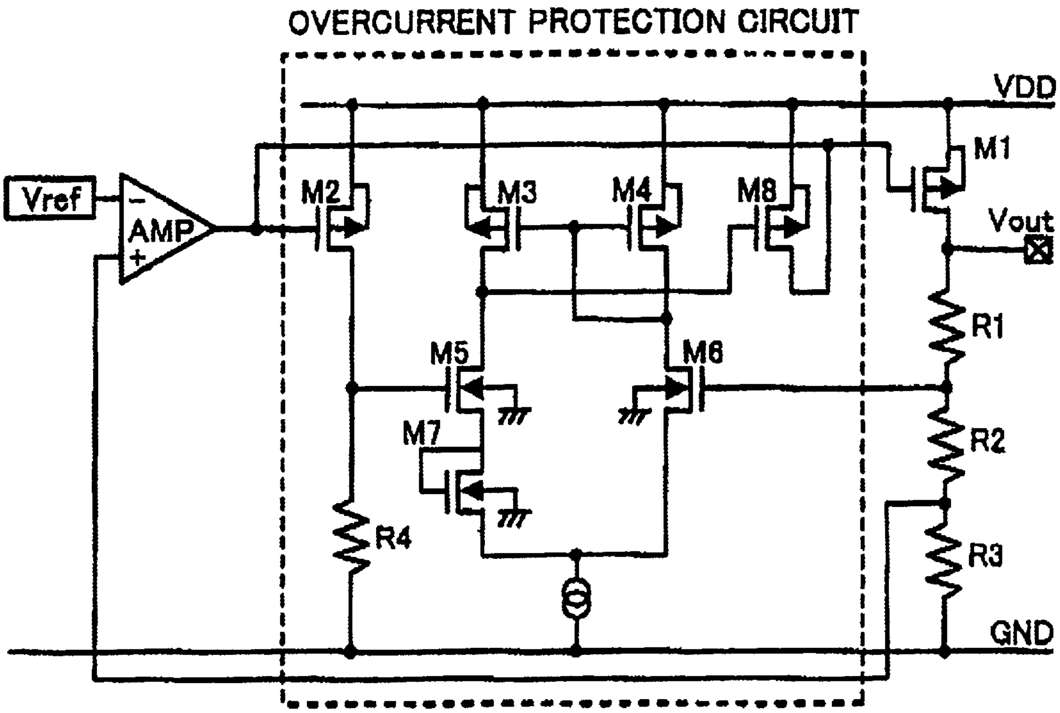
FIG. 1 is a chart illustrating a conventional overcurrent limitation circuit.
Figure 2:
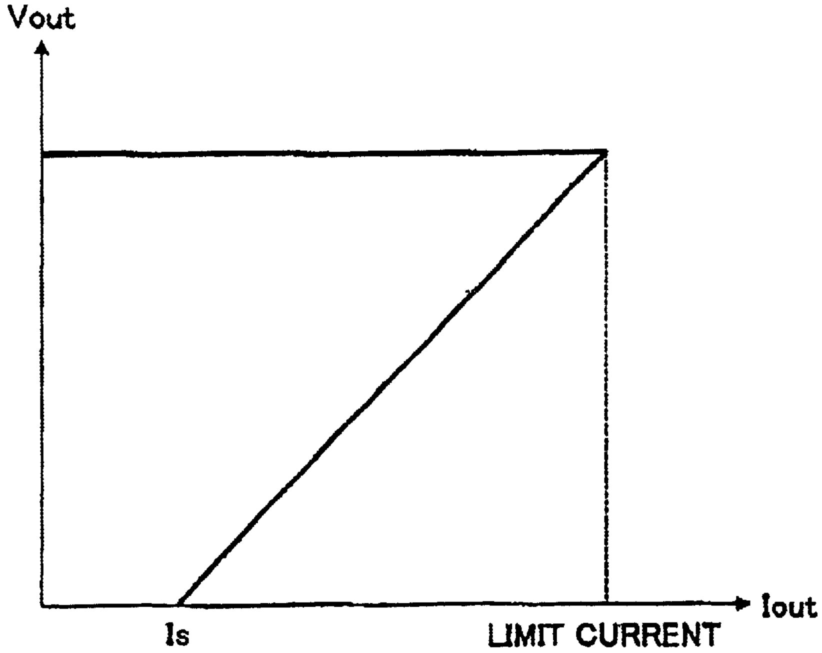
PRIOR ART FIG. 2
FIG. 2 is a chart illustrating output characteristics of the circuit of FIG. 1.
Figure 3:
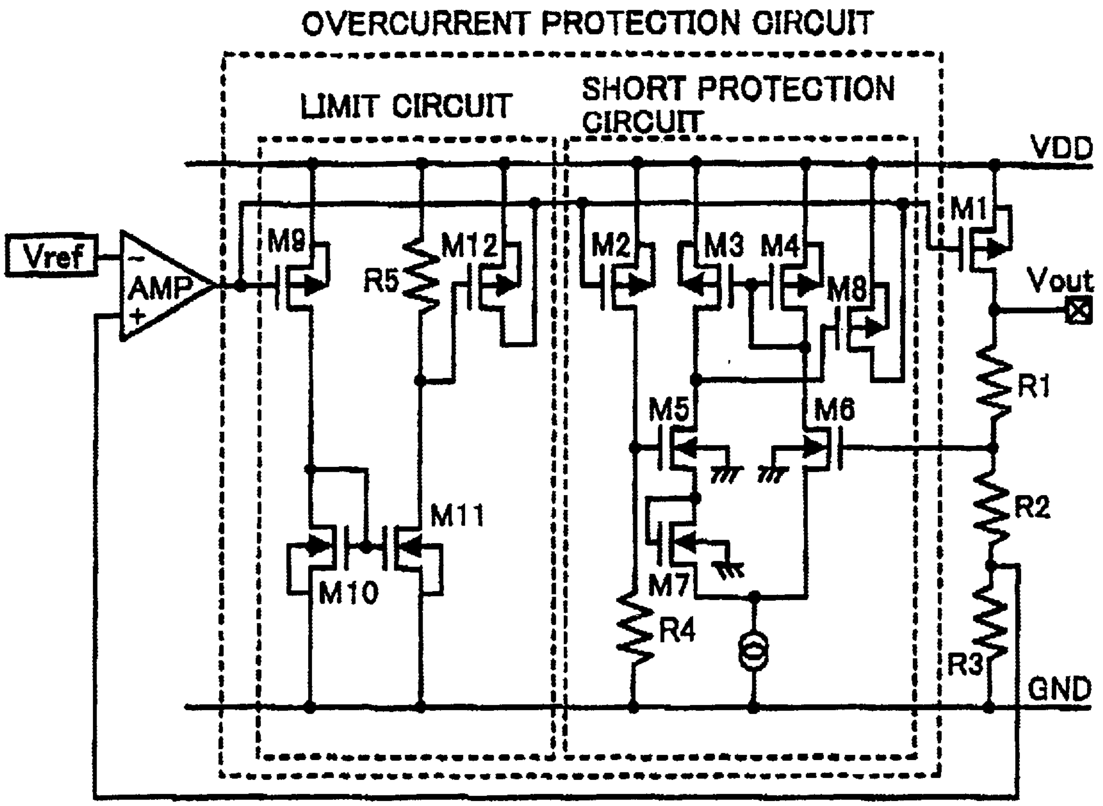
FIG. 3 is a chart illustrating the other type of a conventional overcurrent limitation circuit.
Figure 4:
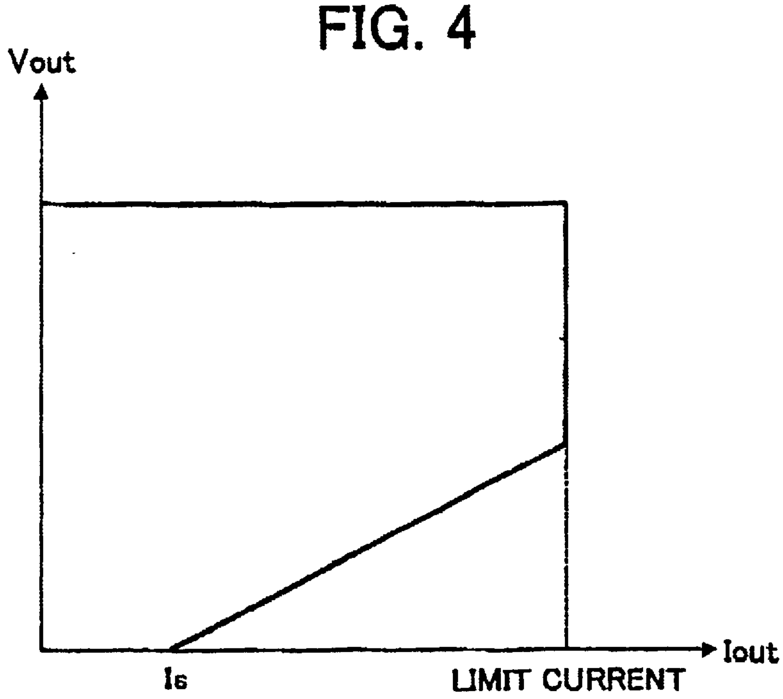
PRIOR ART FIG. 4
FIG. 4 is a chart illustrating output characteristics of the circuit of FIG. 3.
Figure 5:
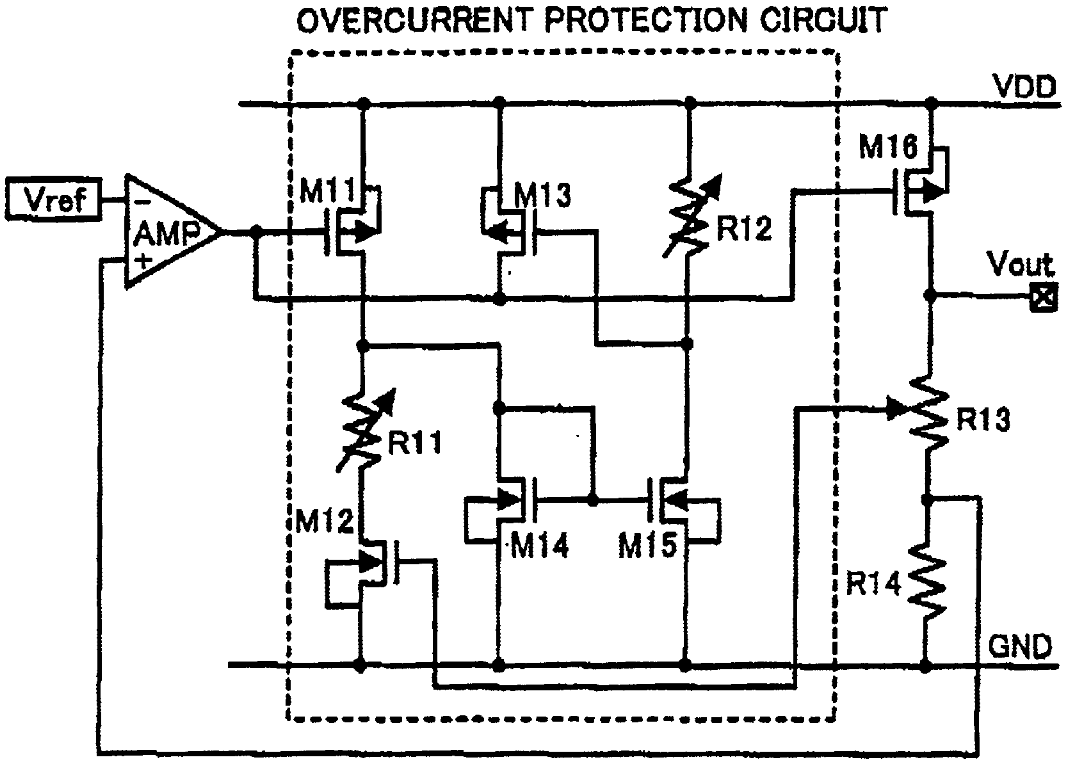
FIG. 5 is a chart illustrating the first embodiment of a circuit.

Referring now to the drawings, wherein like reference numerals designate identical or corresponding parts throughout the several views, and in particular in FIG. 5, the first embodiment of an overcurrent limitation circuit according to the present invention is illustrated. The circuit forms a stabilization electric power supply that renders Vout to be constant by controlling a transistor M16 in accordance with a signal obtained by amplifying a difference between a voltage, obtained by dividing an output voltage Vout by resistors R13 and R14, and a reference voltage Vref using a differential amplifier (AMP). The circuit further includes a transistor M11 that monitors a current flowing through an output transistor M16 in a prescribed ratio, a resistor R11 and transistors M14 and M15 which determine an amount of a current to flow into a resistor R12 in accordance with the monitored current, a current direction changing use transistor M12 that changes a current flowing direction either toward the transistor M14 or resistance R11 by turning ON and OFF at a prescribed voltage value obtained by dividing an output voltage Vout, and a transistor M13 that controls the output transistor M16 while performing the above-described operations.

The output transistor M16 and monitor use transistor M11 are P-channel type MOS transistors, and respective sources and gates of the transistors are connected to each other. Further, an output current of the monitor transistor M11 is controlled to flow into the resistor R11. Further, the switching device M12 is a N-channel type MOS transistor and is serially connected to the resistor R11. The transistors M14 and M15 form a current mirror circuit. An output section of the monitor use transistor M11 is connected to an input section of the current mirror circuit.

The control use transistor M13 is formed from a P-channel MOS type transistor. A source of the transistor M13 is connected to that of the output transistor M16. In addition, a gate of the transistor M13 is connected to an output section of the current mirror circuit. Further, a drain of the transistor M13 is connected to a gate of the above-described output transistor M16.

An operation of the overcurrent limitation circuit is now described. When a current flowing through the output transistor M16 grows, a current flowing through the transistor M11 also grows. When the output voltage Vout is high, since the transistor M12 is turned ON, almost all of the current flowing through the transistor M11 flows into the resistor R11. As a result, the gate voltage of the transistor M14 rises up to a prescribed voltage at a prescribed current value. Thus, a current value flowing through the resistor M12 is determined. Thereby, the gate potential of the transistor M13 descends, and the transistor M13 is turned ON. Thereby, the gate potential of the output transistor M16 is controlled and the output voltage Vout descends.

When the output voltage Vout descends, the transistor M12, which takes a division of the output voltage in as a gate voltage, is turned OFF. When the transistor M12 is turned OFF, the current having been flowing through the resistor R11 comes to flow through the transistor M14 of the current mirror section. When a substantial current flows through transistor M14, a current flowing through the resistor R12 increases, and the gate voltage value of the transistor M13 decreases more. As a result, a value of a current flowing through the output transistor M16 is increasingly limited.

Figure 6:
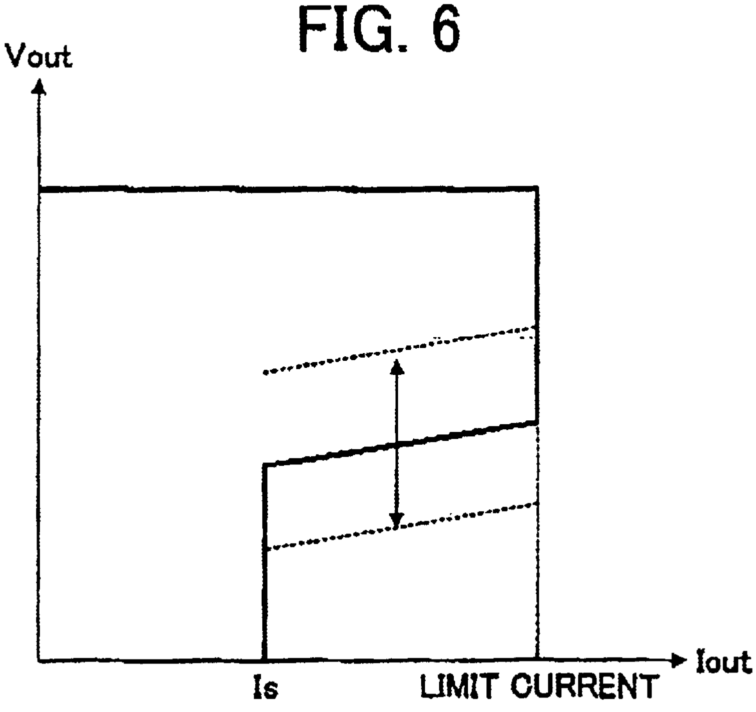
FIG. 6 is a chart illustrating output characteristics of the circuit of FIG. 5.

By switching the above-described two steps, a prescribed shape of characteristics is obtained as shown in FIG. 6. Thus, both the limit current and short current value Is are determined by the resistors R11 and R12. Whereas, switching the limit current form and to short current Is can be achieved at an optional point in the drawing by changing a supplying point of a gate voltage for the transistor M12 of changing control use using a resistor R13 as shown in the drawing.

In the above-described embodiment, due to switching at one point, narrowing of a limit region so as to emphasize a protection function and broadening a region for flowing a substantial current so as to render initial rise to be smooth stand trade-off relation, and their needs cannot simultaneously be satisfied.

Figure 7:
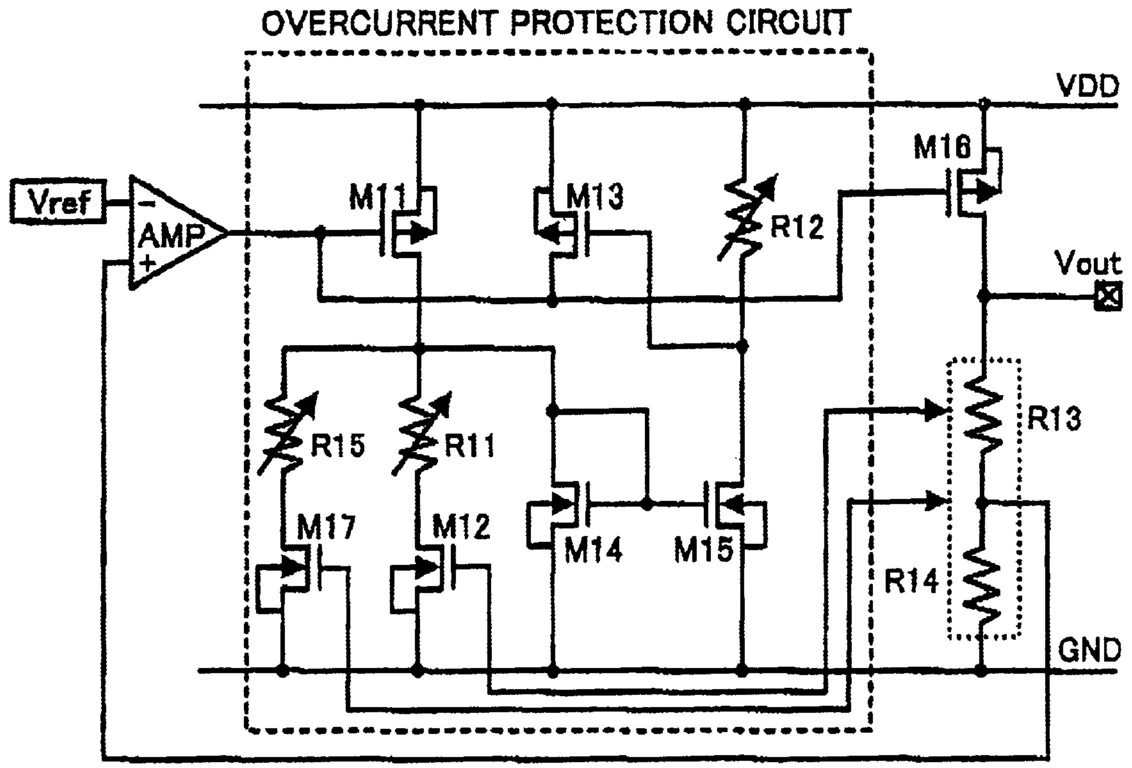
FIG. 7 is a chart illustrating the second embodiment of a circuit.

Then, the second embodiment of a circuit is illustrated in FIG. 7. As shown, beside the resistor 11 and transistor M12, a resistor 15 and transistor M17 are newly added. In addition, a gate voltage supplying point is taken in from a point lower than that for the transistor M12.

When the output voltage Vout is high, both transistors M12 and M17 are tuned ON. However, when the output voltage Vout starts descending, the transistor M17, which takes a gate voltage in from a point where an output voltage feedback resistance is low, is initially turned OFF. Since a current value flowing through the transistor M14 varies when the transistor M17 is turning OFF, the limit current varies.

Figure 8:
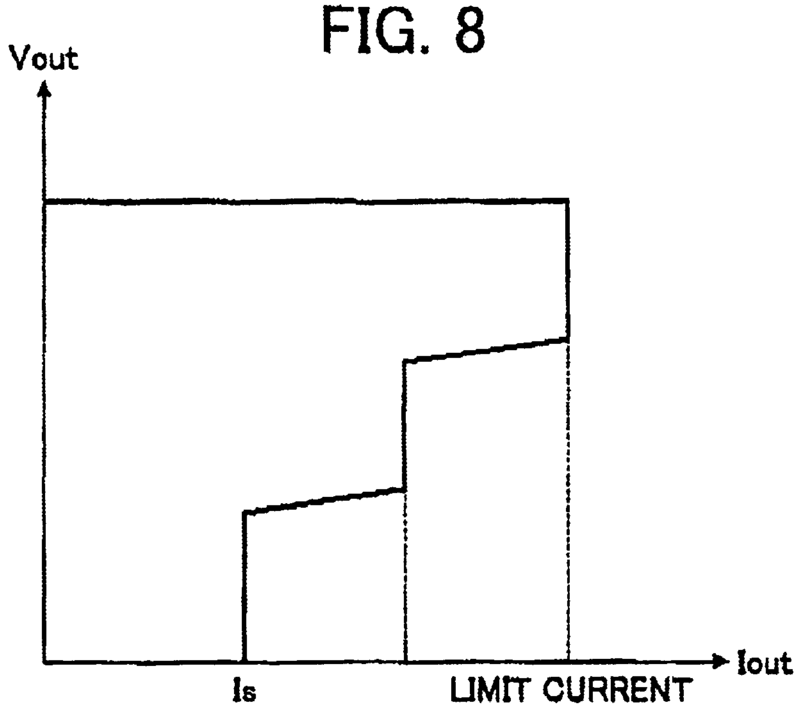
FIG. 8 is a chart illustrating output characteristics of the circuit of FIG. 7.

When the output voltage Vout increasingly descends, the transistor M12 also is turned OFF, and the limit current varies again. As a result of such control, characteristics having a prescribed shape are obtained as illustrated in FIG. 8.

Obviously, numerous additional modifications and variations of the present invention are possible in light of e above teachings. It is therefore to be understood that within the scope of the appended claims, the present invention may be practiced otherwise than as specifically described herein.

What is claimed is:

1. A direct current stabilization electric power supply circuit comprising:

an over current limitation circuit for driving and controlling an output transistor to output constant voltage in accordance with an output from a differential amplifier for amplifying a difference between a reference voltage and a voltage proportional to the output voltage, said overcurrent limitation circuit comprising:

a proportional output current generating device configured to generate a current proportional to a current flowing through the output transistor;

a current/voltage converting device configured to convert an output current from the proportional output current generating device into a voltage;

a switching device configured to supply the current/voltage converting device with the output current from the proportional output current generating device when the output voltage is higher than a prescribed level, and interrupt the supplying when the output voltage is lower than the prescribed level; and a control device configured to control the output transistor to output a current in accordance with an output voltage at a drain of the proportional output current generating device.

2. A direct current stabilization electric power supply circuit comprising: an over current limitation circuit for driving and controlling an output transistor to output constant voltage in accordance with an output from a differential amplifier for amplifying a difference between a reference voltage and a voltage proportional to the output voltage, said overcurrent limitation circuit comprising:

a proportional output current generating device configured to generate a current proportional to a current flowing through the output transistor;

a first current/voltage converting device configured to convert an output current from the proportional output current generating device into a voltage;

a second current/voltage converting device configured to convert an output current from the proportional output current generating device into a voltage;

a switching device configured to supply the first and second current/voltage converting devices with the output current from the proportional output current generating device when the output voltage is higher than a prescribed level, and supply only the second current/voltage converting device when the output voltage is lower than the prescribed level; and a control device configured to control the output transistor to output a current in accordance with an output voltage at a drain of the proportional output current generating device.

3. The direct current stabilization electric power supply circuit according to claim 2, wherein at least one of said first and second current/voltage converting devices has a variable current/voltage conversion coefficient.

4. The direct current stabilization electric power supply circuit according to claim 2, wherein said current/voltage converting device and switching device are paired and multiple, and wherein all of the multiple switching device is turned ON when the output voltage is normal, and the multiple switching devices are turned OFF one by one as the output voltage descends.

5. The direct current stabilization electric power supply circuit according to any one of claims 1 to 4, wherein the output transistor and proportional output current generating device are formed from P-channel MOS type transistors, wherein each of sources and gates of the transistors are connected to each other, and wherein the output voltage is output from a drain of the output transistor, and an output current of the proportional output current generating device is supplied to the current/voltage converting device from the drain.

6. The direct current stabilization electric power supply circuit according to any one of claims 1 to 4, wherein said current/voltage converting device is formed from a resistance, and said switching device is formed from a N-channel type MOS transistor and is serially connected to the current/voltage converting device.

7. The direct current stabilization electric powert supply circuit according to any one of claims 1 to 4, wherein said control device includes a current mirror circuit, and wherein an output section of the proportional output current generating device is connected to an input section of the current mirror circuit.

8. The direct current stabilization electric power supply circuit according to any one of claims 1 to 4, wherein said control device is formed from a P-channel type MOS transistor, wherein sources of the transistor and output transistor are connected to each other, wherein the gate of the transistor is connected to an output section of the current mirror circuit, and wherein a drain of the transistor is connected to a gate of the output transistor.

* * * * *